April 30, 1957     C. W. WILHIDE     2,790,468
GUARD FOR PORTABLE POWER DRIVEN CIRCULAR SAW
Filed April 14, 1955     2 Sheets-Sheet 1
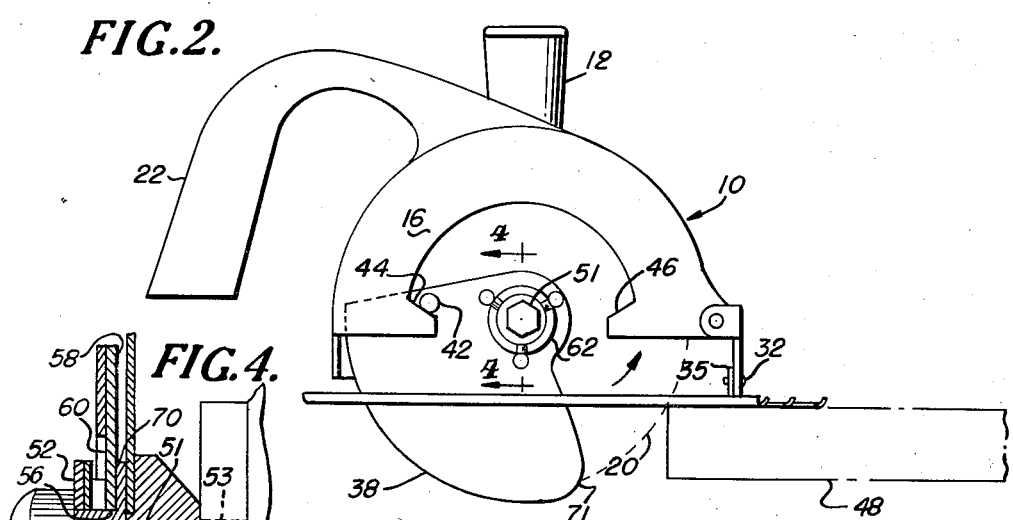
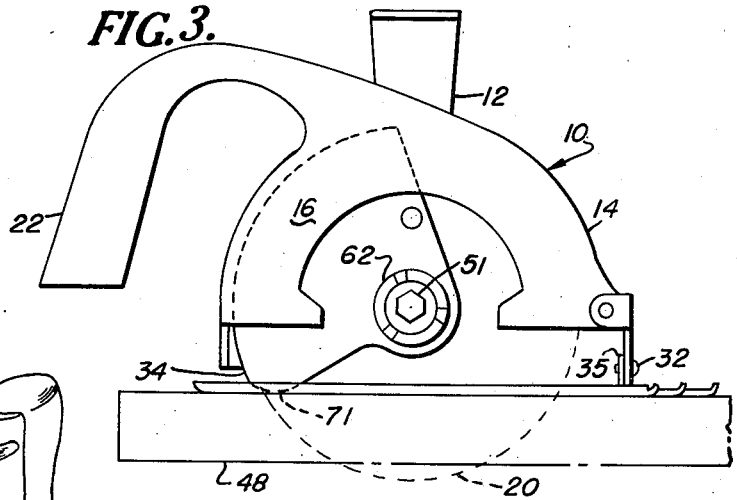
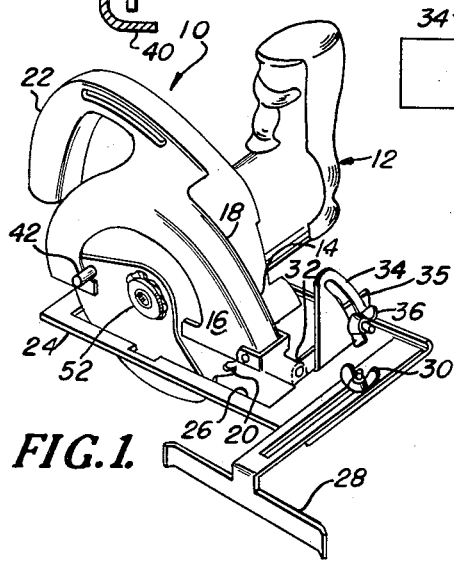
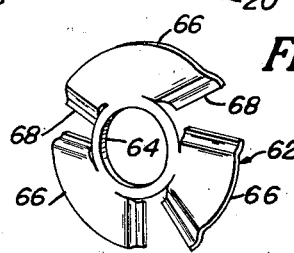
INVENTOR
CHARLES W. WILHIDE
BY
*Cushman Darby & Cushman*
ATTORNEYS

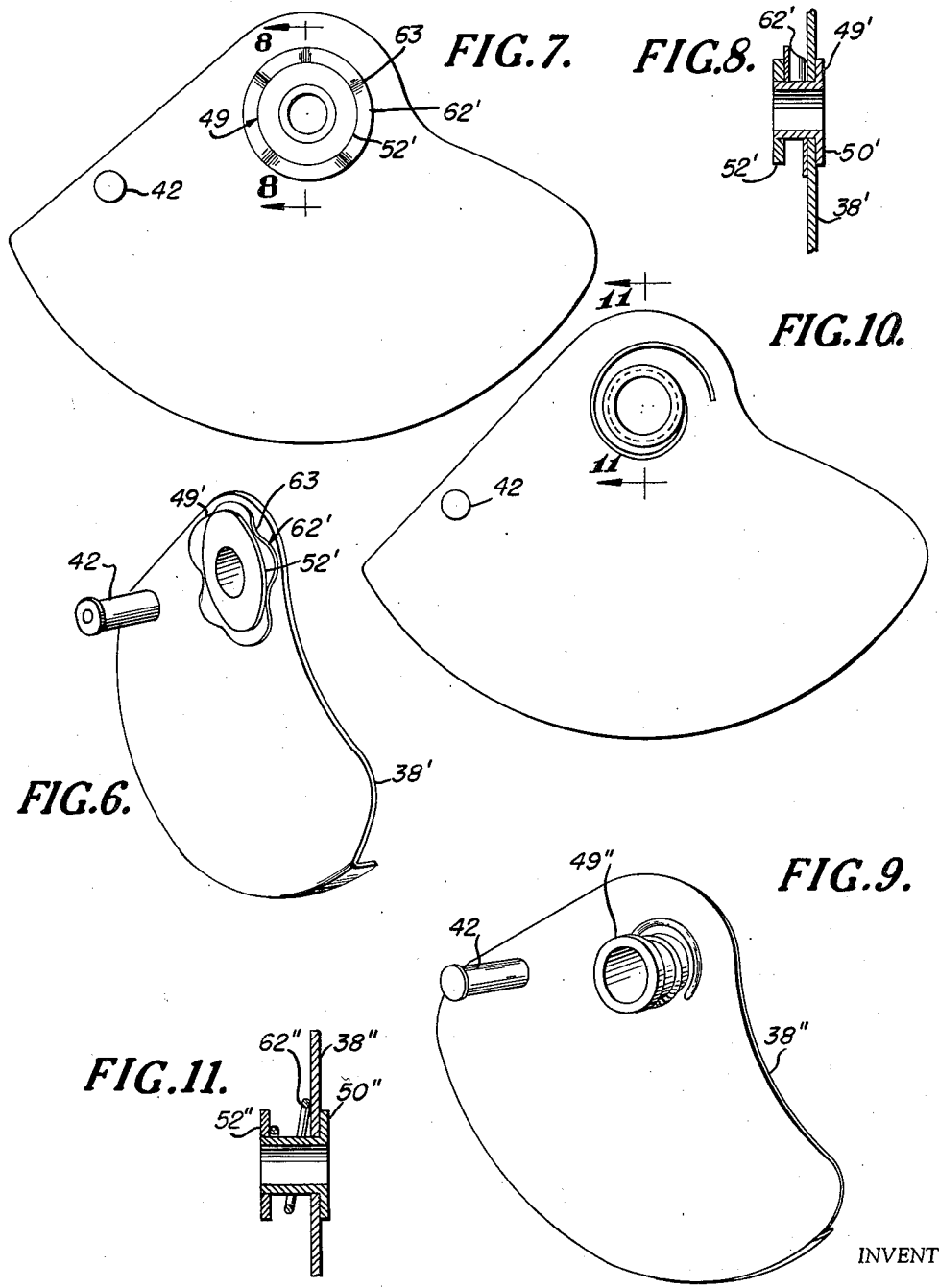

United States Patent Office 2,790,468
Patented Apr. 30, 1957

2,790,468

GUARD FOR PORTABLE POWER DRIVEN CIRCULAR SAW

Charles W. Wilhide, Akron, Ohio, assignor to The Black & Decker Mfg. Co., Towson, Md., a corporation of Maryland Application April 14, 1955, Serial No. 501,297

11 Claims. (Cl. 143—159)

The present invention relates to sawing devices and, more particularly, to a portable power driven circular saw having a telescoping guard member.

The particular embodiment of the invention herein shown and described is a circular saw attachment adapted to be driven directly from the drive spindle of a portable electric drill or the like. In such power driven circular saw devices, the cutting surface of the circular saw blade is usually provided with a guard member which encloses the same when the saw is not actually being used. Heretofore, telescoping guard members for circular saw devices have been cumbersome in design, thus requiring a very large housing. Further, such guard members have been expensive to manufacture.

An object of the present invention is to provide a guard member for enclosing a circular saw which will be simple in construction and inexpensive to manufacture.

Another object of the present invention is to provide a circular saw device with a telescoping guard member which will telescope into a minimum space and, consequently, does not require a cumbersome housing for the device. By providing a telescoping guard member which pivots about the axis of rotation of the circular saw blade, the housing can be made to a minimum size.

Still another object of the present invention is the provision of a saw device having a telescoping guard member which will positively return to its blade enclosing position regardless of the position of the saw device when the circular saw blade is rotating but the device is not being used.

A still further object of the present invention is to provide a guard member mounted on the rotating spindle of the circular saw blade which is normally urged to the blade enclosing position by frictional force between the rotating spindle and the guard member.

Still another object of the present invention is to provide a guard member for circular saw blades which is frictionally operated to the normal blade enclosing position by means of rotation of the saw blade spindle, the friction force applied to the guard to return it to its normal position being controlled within a specified range.

These and other objects of the present invention will appear more fully in the following specification, claims and drawings in which:

Figure 1 is a perspective view of the saw device of the present invention with the spindle bottom omitted for purposes of clarity;

Figure 2 is a side elevational view of the saw device of the present invention with the telescoping guard member in the normal blade enclosing and protecting position;

Figure 3 is a view similar to Figure 2 but showing the saw device in use and the guard member in a telescoped position;

Figure 4 is an enlarged cross-sectional view taken on the line 4—4 of Figure 2;

Figure 5 is a detailed perspective view of the friction controlling element of Figure 4;

Figure 6 is an enlarged perspective view of a modified form of telescoping guard member;

Figure 7 is a side elevational view of the telescoping guard member disclosed in Figure 6;

Figure 8 is a fragmentary cross-sectional view taken on the line 8—8 of Figure 7;

Figure 9 is an enlarged perspective view of another modification of telescoping guard member;

Figure 10 is a side elevational view of the telescoping guard member of Figure 9;

Fgure 11 is a cross-sectional view taken on the line 11—11 of Figure 10.

Referring in detail to the drawings wherein like reference numerals or characters represent like or similar parts, the saw device of the present invention comprises a saw attachment generally designated by the numeral 10 and a portable electric hand drill generally designated by the numeral 12. Saw attachment 10 is provided with suitable means (not shown) for detachably securing the electric drill 12 or the like thereto in the position shown in Figure 1. Before mounting the electric drill 12 on the saw attachment 10, the conventional chuck of the drill is removed so that the drive spindle of the drill will be exposed and can be utilized for directly driving a circular saw blade 20.

Saw attachment 10, as best shown in Figures 1, 2 and 3, includes a housing 14 having a front wall 16 and a rear wall 18 which defines a cavity for the circular saw blade 20. The upper portion of housing 14 is provided with a handle 22 which provides an easy grip for the operator when using the saw device. Housing 14 is provided on its lower surface with a base plate or shoe 24 having a flat underside and a cutout portion 26 through which the cutting portion of saw blade 20 extends. The forward end of base plate or shoe 24 is provided with a transversely extending and adjustable rip fence 28 which is adjustably mounted on the base plate by means of wing nut and bolt assembly 30. The rip fence is used when ripping boards longitudinally of their length and provides a convenient means for guiding the saw in a straight parallel line with the edge of the board being ripped.

Base plate or shoe 24, which as previously stated, is mounted on the lower end of housing 14, is pivotally mounted on a longitudinal axis with respect to the housing so that the angle with which the blade cuts with respect to a piece of work can be adjusted. As best shown in Figure 1, base plate or shoe 24 is pivoted at 32 and is adjustably held in position by means of the arcuately slotted member 34 on shoe 24 and the wing nut and bolt assembly 36 mounted on a bracket 35 connected to housing 14.

A guard member 38 is adapted to pivot about the axis of rotation of blade 20 and telescope into housing 14 as shown in Figures 2 and 3. Guard member 38 is arcuate in shape and substantially covers the exposed portion of blade 20 extending out of housing 14 when the saw attachment is not being used and, thus, the operator is protected at all times. As shown in Figure 4 the peripheral surface of arcuate guard member 38 is inturned at 40 so that there will be no chance of the blade being exposed to the operator's hand or to the surface upon which the tool is set while the blade 20 is rotating.

Mounted on guard member 38 is a stop pin 42 which is adapted to engage the stops 44 and 46 on the outer or front wall 16 of housing 14. In the position shown in Figure 2, the stop pin 42 is engaging stop 44 and guard 38 is enclosing blade 20. However, when it is desired to make pocket cuts, the stop pin 42 enables the operator, without the danger of placing the fingers near the saw blade, to retract the guard member 38 to a position where the stop pin rests against the stop 46. For normal cutting operation, such as disclosed in Figure 3, the guard automatically and easily pivots about the axis of rotation of blade 20 when it engages a piece of work 48 to a position where it is out of the path of the piece of work and exposes the blade.

In order to automatically return the guard member 38 to the position shown in Figure 2 when the tool is removed from a piece of work, guard member 38 is provided with a friction hub 49 as best shown in Figure 4. Friction hub 49 is provided with flanges 50 and 52 at each of its ends and hub 49 is adapted to rotate and move axially in the aperture 56 of guard member 38. A circular reinforcing plate 58 forms a part of guard member 38 and strengthens the guard member at its position of support on hub 49. The plate 58 in this instance contains the aperture 56 and may be made of a hardened metal. However, it is well within the contemplation of the invention that plate 58 could be eliminated, the guard member being provided with an aperture the size of aperture 56.

Interposed between surface 60 of guard member 38 and the flange 52 of hub 49 is a spring member 62 best disclosed in Figure 5. Spring member 62 is comprised of a flat washer 64 having on its periphery a plurality of arcuate double end leaf springs 66. Leaf springs 66 are each integrally connected to washer 64 intermediate their ends 68. Spring member 62 provides a constant friction force between the flange 50 of hub 49 and the surface 70 of guard member 38. In other words, it requires a force on the end 71 of guard member 38 to cause the guard member to rotate with respect to hub 49 and if this force is removed, the frictional force holding guard member 38 axially against the flange 50 of hub 49 will cause the guard member to rotate with the hub until its stop pin 42 engages the stop 44 on housing 14.

Referring now to Figure 4, it will be seen that the guard member 38 and blade 20 are mounted on a spindle bolt 51 which is adapted to be threaded into a drive spindle 53 of the portable electric drill 12. Spindle bolt 51 clamps hub 49 and blade 20 axially against the drive spindle shaft 53 of drill 12 so that the hub and blade will rotate with the drive spindle of the drill.

It will now be apparent that when motor 12 is operated, saw blade 20 together with friction hub 49 is rotated in the direction of the arrow in Figure 2. Guard member 38 will rotate with hub 49 until it assumes the position shown in Figure 2 where its stop pin 42 engages the stop 44. Hub 49 will continue to rotate against the friction forces caused by the spring member 62, there being sliding contact between flange 50 of hub 49 and the surface 70 of arcuate guard member 38. When the piece of work 48 is engaged by the end 71 of guard member 38, the guard member can be rotated in a clockwise direction about the counterclockwise rotating hub 49 until it assumes the position shown in Figure 3. However, as soon as the saw device is removed from the work and the end 71 of guard member 38 is free of any obstruction, the guard will rotate in a counterclockwise direction to the position shown in Figure 2 because of the friction between flange 50 of hub 49 and the surface 70 of the guard member. Blade 20 will then be enclosed and the operator protected.

Figures 6, 7 and 8 disclose a modification of the telescoping guard member 38 of Figures 1 through 5 inclusive. In Figures 6 through 8, a guard member 38' is provided with a hub 49' which is similar in construction to the hub 49 of Figure 4. Hub 49' has radially outwardly extending flanges 50' and 52' on its ends respectively. However, instead of interposing a spring member 62 such as shown in Figure 5 between one of the flanges of hub 49' and the guard 38', a spring washer 62' is provided. The spring washer 62' is provided with a series of undulations 63 and because of these undulations, the spring washer 62' will cause the hub 49' to be axially displaced so that its flange 50' bears against one side of guard 38' with a controlled force.

The operation of the guard member 38' is similar to guard 38 in that when the saw attachment engages a piece of work 48, the guard member 38' will pivot about the rotating hub 49' against the friction caused by the undulated spring member 62'. When the saw device is removed from the work piece, the friction exerted by spring washer member 62' will cause the guard member 38' to rotate with the hub 49' until stop engaging pin 42 engages the stop 44. When in this position guard 38' will enclose the portion of blade 20 which extends out of casing 14.

Referring now to Figures 9, 10 and 11 another modification of the means for mounting guard member 38 is disclosed. In this modification, guard member 38" is provided with a hub 49" having flanges 50" and 52" at its ends. Instead of having the spring means 62 and 62' interposed between flange 52" and one side of the guard member 38", in this modification a coil spring 62" about hub 49" is provided. One end of coil spring 62" bears against one side of guard member 38" while the other end of the spring bears against the flange 52" urging flange 52" away from the guard member 38". The friction caused by the spring 62" between the flange 50" and guard member 38" will be maintained substantially constant and can be overcome in the same manner as previously described with respect to Figures 1 through 8 respectively.

The terminology used in the specification is for the purpose of description and not for limitation, the scope of the invention being defined in the claims.

I claim:

1. In a power operated circular saw device, a housing, a motor supported in said housing, a spindle operatively connected to said motor for rotation thereby, a circular saw blade mounted on said spindle for rotation therewith and having a portion thereof extending out of said housing to provide a cutting surface, an arcuate guard member supported for partial rotation on an axis of rotation of said spindle, said arcuate guard member normally enclosing the portion of said blade extending out of said housing and capable of rotation to a position exposing said blade, a hub mounted on said spindle for continuous rotation therewith, and means biasing said guard member and said hub axially with respect to each other and to said spindle whereby said guard member has a constant frictional engagement with said hub so that it is normally urged to rotate with said hub to blade enclosing position when said blade is rotating in cutting direction and is capable of rotational movement with respect to said hub and said blade when engaged by a piece of work to thereby expose said blade to the piece of work.

2. A power operated circular saw device of the character described in claim 1, including stop means operatively engaging said guard member when said guard member is in its normal blade enclosing position.

3. In a power operated circular saw device, a housing, a motor secured to said housing, a spindle operatively connected to said motor for rotation thereby, a circular saw blade mounted on said spindle for rotation therewith and having a portion thereof extending out of said housing to provide a cutting surface, an arcuate guard member having a friction hub adapted to be mounted on said spindle, said friction hub being rotatable with said spindle and tending to cause said guard member to rotate therewith to a position normally enclosing the portion of said blade extending out of said housing when the blade is rotating in cutting direction, said guard member being rotatable relative its friction hub and said spindle when engaging a piece of work so as to expose the enclosed portion of said blade to the piece of work, and means between said guard member and its friction hub for controlling the range of force applied to said guard member to return it to its normal blade enclosing position.

4. In a power operated circular saw device, a housing, a motor secured to said housing, a spindle operatively connected to said motor for rotation thereby, a circular saw blade mounted on said spindle for rotation therewith and having a portion thereof extending out of said housing to provide a cutting surface, an arcuate guard member having a friction hub adapted to be mounted on said spindle, said friction hub being rotatable with said spindle and tending to cause said guard member to rotate therewith to a position normally enclosing the portion of said blade extending out of said housing when the blade is rotating in cutting direction, said guard member being rotatable relative its friction hub and said spindle when engaging a piece of work so as to expose the normally enclosed portion of said blade to the piece of work, said friction hub being movable axially with respect to said guard member and including annular radially extending flanges on each of its ends, means interposed between one of said flanges and said guard member to cause the other of said flanges to bear against said guard member with a controlled range of force whereby said guard member normally tends to return to its normal blade enclosing position.

5. A circular saw device of the character described in claim 4 wherein said last-mentioned means is a flat washer having a plurality of arcuate double end leaf springs on its periphery, each of the springs being attached to the washer intermediate their ends.

6. A circular saw device of the character described in claim 4 wherein said last-mentioned means is a spring washer having a plurality of undulations.

7. A circular saw device of the character described in claim 4 wherein said last-mentioned means is a coil spring encircling said friction hub.

8. In a power operated circular saw device, a housing, a motor including a drive spindle secured to said housing and having at least the drive spindle positioned within said housing, a circular saw blade having a center aperture positioned in alignment with said drive spindle, said saw blade having a portion thereof extending out of said housing to provide a cutting surface, an arcuate guard member having a center aperture, a friction hub having radially extending flanges on each end thereof and positioned in the aperture of said guard blade for rotatable and axial movement with respect thereto, means interposed between one side of said guard member and one of the flanges of said friction hub to cause the other flange of said friction hub to bear against the other side of said guard member with a controlled range of force, and a spindle bolt inserted through said hub and said blade and attached to the spindle of said motor so as to clamp said hub and said blade to the spindle of said motor for rotation therewith normally in cutting direction for the blade and a direction for the guard tending to cover the exposed portion of the blade.

9. A circular saw device of the character described in claim 8 wherein the means interposed between one side of said guard member and one of the flanges of said friction hub is a flat washer having a plurality of arcuate double end leaf springs on its periphery.

10. A circular saw device of the character described in claim 8 wherein the means interposed between one side of said guard member and one of the flanges of said friction hub is a spring washer having a plurality of undulations.

11. A circular saw device of the character described in claim 8 wherein the means interposed between one side of said guard blade and one of the flanges of said friction hub is a coil spring encircling said friction hub and having one of its ends bearing against the side of said guard member while its other end is bearing against one of the flanges of said friction hub.

References Cited in the file of this patent

UNITED STATES PATENTS

| Number | Name | Date |
|---|---|---|
| 1,163,517 | Evans | Dec. 7, 1915 |
| 1,409,741 | Lindemon | Mar. 14, 1922 |
| 1,858,459 | Ramey | May 17, 1932 |
| 2,360,488 | Garman | Oct. 17, 1944 |
| 2,543,486 | Briskin | Feb. 27, 1951 |